(12) United States Patent
Wilhelm et al.

(10) Patent No.: US 8,480,528 B2
(45) Date of Patent: Jul. 9, 2013

(54) COAXIAL TRANSMISSION

(75) Inventors: Thomas Wilhelm, Creglingen (DE);
Michael Schmidt, Giebelstadt (DE);
Thomas Bayer, Igersheim (DE)

(73) Assignee: Wittenstein AG, Igersheim (DE)

( * ) Notice: Subject to any disclaimer, the term of this patent is extended or adjusted under 35 U.S.C. 154(b) by 681 days.

(21) Appl. No.: 12/597,538

(22) PCT Filed: Apr. 14, 2008

(86) PCT No.: PCT/EP2008/002937
§ 371 (c)(1),
(2), (4) Date: Oct. 26, 2009

(87) PCT Pub. No.: WO2008/135137
PCT Pub. Date: Nov. 13, 2008

(65) Prior Publication Data
US 2010/0130324 A1 May 27, 2010

(30) Foreign Application Priority Data

Apr. 27, 2007 (DE) .......................... 10 2007 020 415

(51) Int. Cl.
*F16H 1/32* (2006.01)
(52) U.S. Cl.
USPC ............................................. 475/162; 74/640

(58) Field of Classification Search
USPC .................................. 475/162, 180, 343, 344
See application file for complete search history.

(56) References Cited

U.S. PATENT DOCUMENTS

| 2,919,589 | A | * | 1/1960 | Sundt ................................. 74/78 |
| 4,798,104 | A | | 1/1989 | Chen et al. |
| 2001/0052735 | A1 | | 12/2001 | Sakamoto |
| 2009/0205451 | A1 | * | 8/2009 | Bayer et al. ..................... 74/325 |

FOREIGN PATENT DOCUMENTS

| AU | 61792/86 | 10/2009 |
| DE | 341053 | 9/1921 |
| EP | 0201730 | 11/1986 |
| FR | 755284 | 11/1933 |
| WO | WO 9936711 A1 * | 7/1999 |

* cited by examiner

*Primary Examiner* — Sherry Estremsky
*Assistant Examiner* — Lillian Nguyen
(74) *Attorney, Agent, or Firm* — Bachman & LaPointe, P.C.

(57) ABSTRACT

A coaxial transmission, especially a hollow shaft drive, comprising a driving element (7) and a driven element (3), a plurality of radially mobile toothed quadrants (5) providing a gear ratio and transmitting a driving torque between the driving element (7) and the driven element (3). An internal gear (1) or especially the housing for receiving the inner gearing of the internal gear (13) are configured as a multipart structure.

10 Claims, 6 Drawing Sheets

COAXIAL TRANSMISSION

BACKGROUND OF THE INVENTION

The present invention relates to a coaxial transmission, in particular a hollow-shaft transmission, with a driving element and with a driven element, a step-up and transfer of a drive torque between the driving element and driven element taking place via a plurality of radially movable toothed quadrants.

Conventional transmissions are known and obtainable commercially in many different forms and versions. Conventional coaxial transmissions, however, have the disadvantage that they have a highly complex construction and allow only internal shafts and hollow shafts which possess a small diameter in relation to the overall diameter of the transmission. Moreover, conventional coaxial transmissions have a highly complex set-up and permit only very small inside diameters. Furthermore, conventional coaxial transmissions are very heavy, are much too wide and have a large diameter in relation to the useful power.

Both EP 0 201 730 A1 and FR 755 284 show coaxial transmissions. In these, there is in each case the possibility of inserting a planetary transmission into the hollow shaft. The disadvantage, however, is that, because of the construction size, no planetary transmissions with power data fitting with the hollow-shaft transmissions or leading to expedient technical implementation can be used.

In addition, a universal use of a coaxial transmission is to be possible by ensuring converted and built-on variants of any type, employing the same body casing and using a multiplicity of identical components.

The object of the present invention is to provide a coaxial transmission of the type initially mentioned, which eliminates the disadvantages mentioned, which affords a large inside diameter and which can be produced universally, even while ensuring converted and built-on variants of any type.

SUMMARY OF THE INVENTION

The object is achieved by providing a coaxial transmission comprising a driving element and a driven element, a plurality of radially movable toothed quadrants providing a step-up and transfer of a drive torque between the driving element and driven element, wherein the driving element is a hollow shaft into which a prestage is inserted.

In the present invention, it has proved especially advantageous to provide a coaxial transmission, in particular a hollow-shaft transmission, which ensures a large inside diameter of the driving element.

In the driving element itself, a plurality of toothed quadrants are mounted which are movable radially outward and which then engage into a ring-wheel internal toothing of a ring wheel.

Owing to a multiplicity of casing parts which can then be connected axially to the ring-wheel internal toothing in each case on both sides, a flexible mounting of the actual driven element with respect to the casing parts and consequently with respect to the ring-wheel internal toothing can also be produced.

A highly compact coaxial transmission can thus be provided, which has as large an inside diameter as possible, along with a small overall diameter, and with a small width, thereby affording a novel possibility for using a coaxial transmission in the most diverse possible sectors with a high power density.

This basic skeleton transmission may then have inserted into it, for example into the driving element, a first prestage as a planetary prestage which can be driven via the various drive shaft pinions or, as shown in a further exemplary embodiment, via an independent electric drive inserted coaxially on the inside electrically.

Furthermore, it is also conceivable that, with a large inside diameter, a hollow-shaft electric drive with high drive power can be connected axially adjacently to the one casing part, in particular axially adjacently to the driving element, a hollow-shaft rotor with approximately the same inside diameter being connectable directly to the driving element. This rotor is then driven and mounted via corresponding motor casings and coil windings contained therein.

Thus, a coaxial transmission with a very large inside diameter and with the smallest possible outside diameters and with a high drive power can be produced.

In a further exemplary embodiment of the present invention, a prestage, preferably as a planetary prestage, may also be inserted axially in an annular manner between conventional skeleton transmissions or coaxial transmissions and a hollow-shaft electric drive, so that a hollow-shaft transmission, in particular a coaxial transmission with a hollow-shaft electric drive, with a prestage and with an actual hollow-shaft transmission having an extremely large inside diameter can likewise be formed.

As a result, with the inside diameters of the driving element being very large, very high torques can be transferred, while, overall, the construction size and construction weight of the entire coaxial transmission are markedly minimized.

BRIEF DESCRIPTION OF THE DRAWINGS

Further advantages, features and details of the invention may be gathered from the following description of preferred exemplary embodiments and from the drawing in which:

FIG. 1b shows a longitudinal section through the coaxial transmission according to FIG. 1a;

DETAILED DESCRIPTION

Figure 1A:
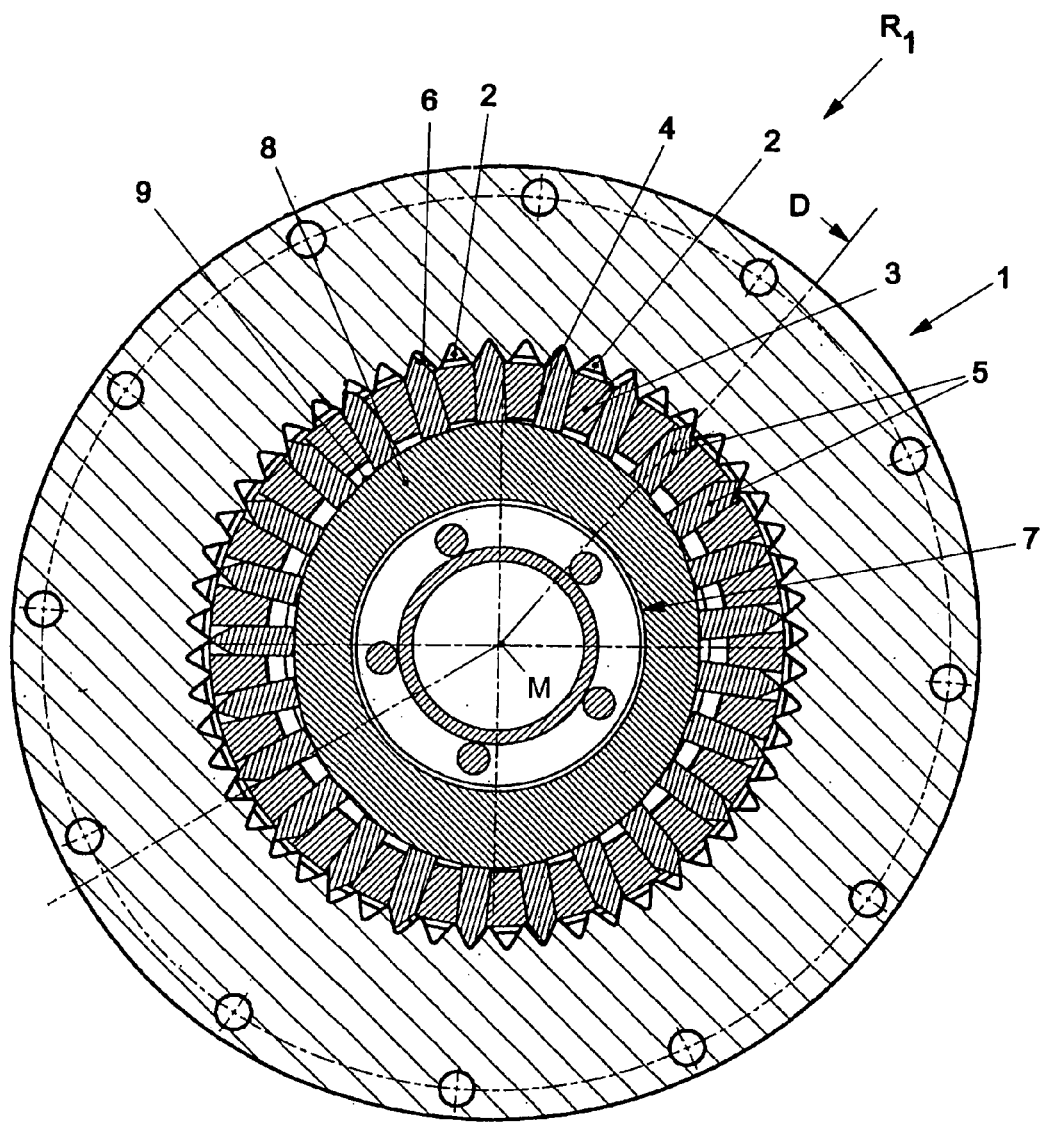
FIG. 1a shows a cross section through a coaxial transmission, in particular through a hollow-shaft transmission.

According to FIG. 1a, a coaxial transmission $R_1$ according to the invention has a ring wheel 1 which possesses internal teeth 2. Inside the ring wheel 1, a driven element 3 is formed, which possesses a plurality of guides 4 in which toothed quadrants 5 are mounted so as to be displaceable radially to and fro and are provided at one end with tooth flanks 6.

Inside the driven element 3 having received toothed quadrants 5, a driving element 7, designed as a hollow shaft, is provided, which has an external profiling 8. The profiling 8 may be of polygonal or cam-like design with one contour, with a plurality of different contours or with a plurality of elevations.

If, for example, the driving element 7 is driven in rotation about a mid-axis M, the individual toothed quadrants 5 are correspondingly moved radially outward into the teeth 2 of the ring wheel 1 due to the profiling 8 via the outer contour 9 of the latter. Owing to the differing number of teeth 2 of the ring wheel 1 in relation to the different number of toothed quadrants 5 which are partially in engagement, a step-up ratio can be set. In this case, the stepped-up drive power which is introduced via the driving element 7 can be transferred selectively via the driven element 3 or the ring wheel 1.

It is important in this case that either the driven element 3 is designed as a stationary element and the ring wheel 1 is designed to be rotatable radially as a driven element or the ring wheel 1 is designed to be stationary and the driven element 3 is designed as a straightforward driven element for receiving the toothed quadrants 5. Both possibilities and variants are to be included here.

Figure 1B:
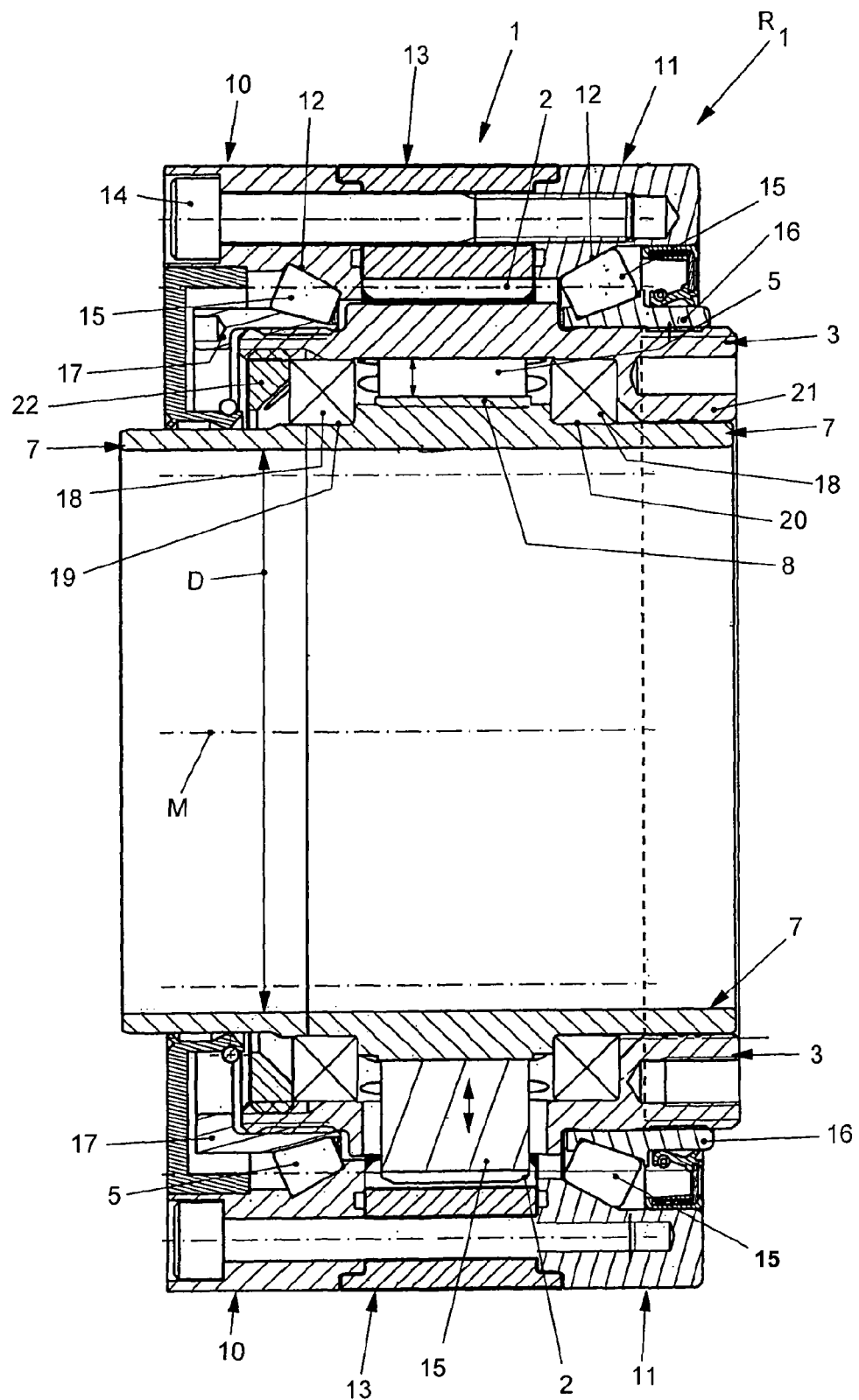

The set-up of the present coaxial transmission $R_1$, as illustrated in longitudinal section according to FIG. 1b, has proved to be especially advantageous for achieving as large an inside diameter D as possible of the driving element 7. In this case, in the present invention, the ring wheel 1 consists of a first casing part 10 and a second casing part 11 and of a ring-wheel internal toothing 13 which are of annular design.

The two casing parts 10, 11 have an inwardly directed and outwardly inclined driven bearing surface 12. A ring-wheel internal toothing 13 is inserted axially between the two casing parts 10, 11.

Via a plurality of fastening elements 14, the first casing part 10 and, axially, the adjacent ring-wheel internal toothing 13 and the casing part 11 adjacent to this can be connected fixedly or releasably to the actual ring wheel 1.

Instead of the fastening element 14, welded joints or the like may also serve for securing the casing part 10 to the ring-wheel internal toothing 13 and to the casing part 11. The invention will not be restricted to this.

However, to achieve as large an inside diameter D as possible, the multiplicity of parts of the ring wheel 1 has proved to be especially advantageous. Moreover, different ring-wheel internal toothings 13 can, using identical or similar casing parts 10, 11, be inserted, employed or in the event of wear, if appropriate, exchanged universally with different sizes and step-ups.

Inside the ring-wheel internal toothing 13, the teeth 2 are formed, into which the toothed quadrants 5 can be pushed by the driving element 7 being driven in rotation.

In this case, in the present invention, it has proved advantageous that the ring wheel 1 is mounted, centered radially and axially with respect to the driving element 7, in particular, via the casing parts 10, 11 by means of their driven bearing surfaces 12 inclined obliquely outward. In this case, the driven bearings 15 are connected on the flange side of the driving element 7 to the driven element 3 via a bearing receptacle 16.

The driven bearings 15 can be moved in on the end face via the bearing receptacle 16 and provide a mounting in the casing part 11, in particular with respect to the driven bearing surface 12. On the opposite side, the bearings 15 are supported via the peripheral bearing receptacle 17 against the driven bearing surface 12 of the casing part 10. The bearing receptacle 17 is supported on the driven element 3. Thus, owing to the multiplicity of the casing parts 10, 11 and the ring-wheel internal toothing 13, all the components can be mounted coaxially with respect to the driven element 3, especially also with the toothed quadrants 5 being inserted.

Furthermore, in the present invention, it has proved advantageous that the driven element 3 is supported or mounted with respect to the coaxially internal driving element 7 via drive bearings 18. The driving element 7 is mounted coaxially inside the driven element 3 via the drive bearings 18, the latter being arranged on bearing seats 19, 20 which are in each case axially contiguous to the profiling 8. A projection 21 is formed in the region of the driven element 3 from the latter and serves for the axial abutment of the drive bearing 18. The axially opposite drive bearing 18 is secured with respect to the driven element 3 via a bearing holding ring 22.

A coaxial transmission $R_1$ is thus provided which allows a very large inside diameter D of the driving element 7 and, moreover, has an overall diameter which is also very small, along with a very small width of the coaxial transmission. An extremely compact coaxial transmission is thereby provided.

Figure 2A:
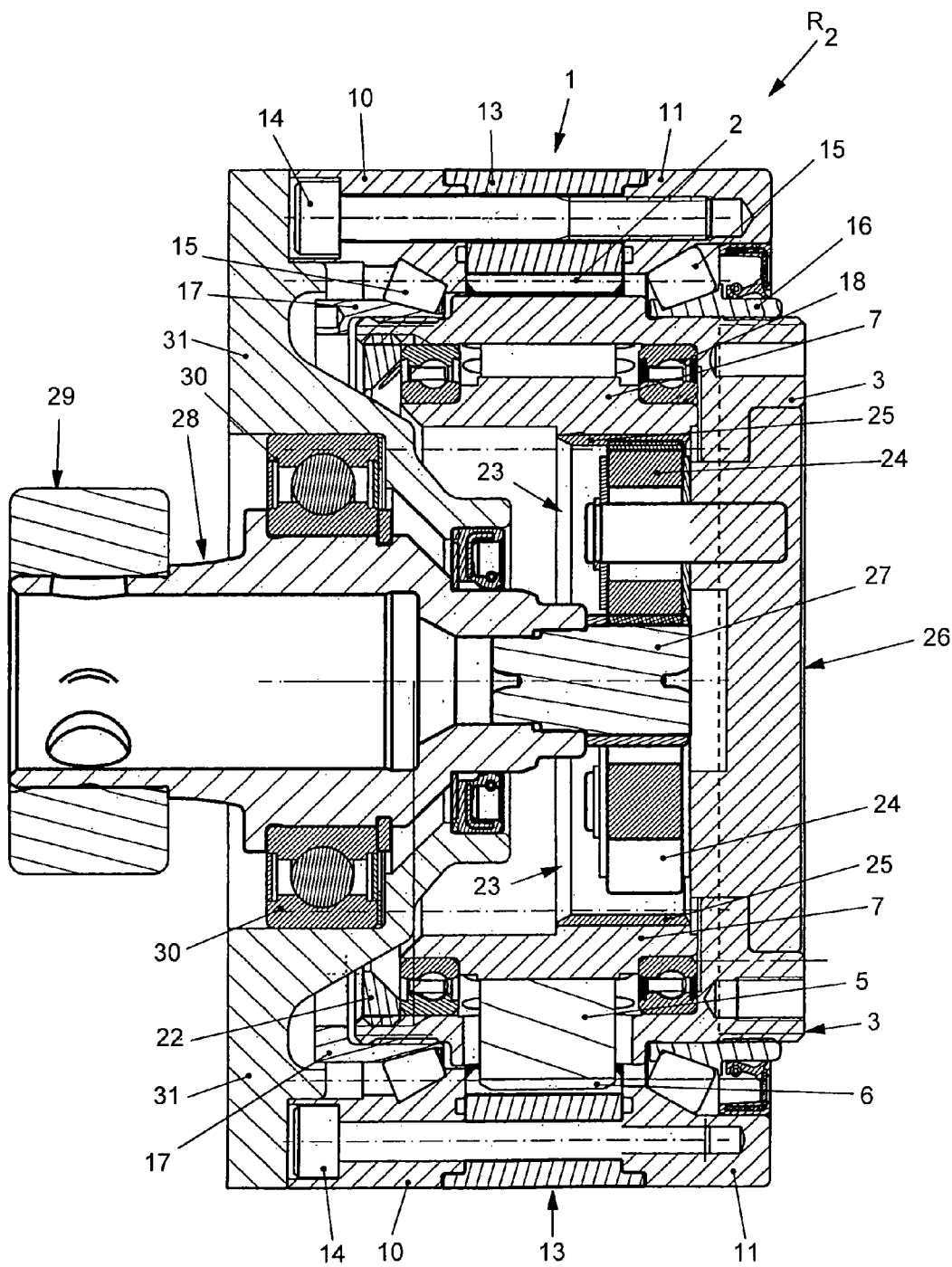
FIG. 2a shows a longitudinal section through a further exemplary embodiment of a coaxial transmission according to FIG. 1b with a prestage inserted according to the invention.

FIG. 2a shows essentially a coaxial transmission $R_2$ which corresponds in terms of its basic structure and set-up to the coaxial transmission $R_1$ according to FIG. 1b. The difference, here, is that, inside the driving element 7 which is likewise designed as a hollow shaft, this is in engagement with a prestage 23, in particular the planetary prestage. In this case, the prestage 23 is inserted coaxially within the very large inside diameter D of the driving element 7 and, due the large inside diameter D, makes it possible for the prestage 23 to have a very high efficiency.

The prestage 23 designed as a planetary prestage engages via a plurality of planets 24 into an internal toothing 25 of the driving element 7. The planets 24 are mounted via a common planet wheel carrier 26 which, in turn, is connected coaxially to the driven element 3. The planets 24 are meshed with a common sun wheel 27. In this case, the torque can be driven via a drive shaft 28 with a clamping hub 29 seated on it, if appropriate, a drive pinion, a splined shaft, a feather key or the like. The drive shaft 28 is supported with respect to a bearing casing 31 via a bearing 30 and is connected axially to the casing part 10.

It is advantageous in the present invention that a prestage 23 can be inserted coaxially inside the coaxial transmission $R_2$, and, because of the relatively large inside diameter D of the driving element 7, appropriate step-up stages, in particular prestages 23, can also be inserted coaxially inside the coaxial transmission $R_2$. Here, too, it is also possible to integrate a prestage 23 inside the coaxial transmission $R_2$, with the coaxial transmission $R_2$ having a minimal overall diameter, along with the smallest possible width.

Figure 2B:
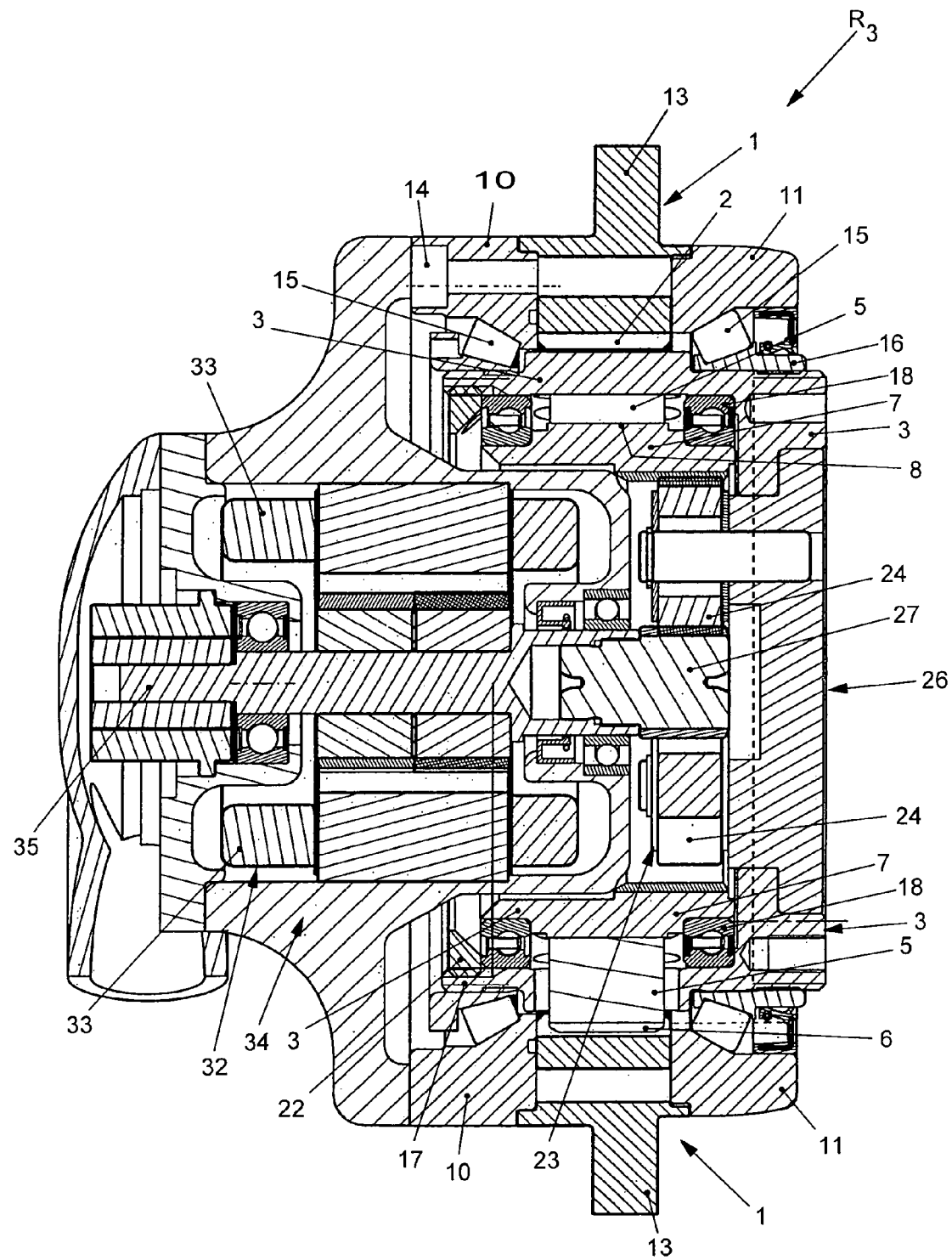
FIG. 2b shows a longitudinal section through a further exemplary embodiment of a coaxial transmission with a coaxially inserted prestage and with an adjacent electric drive.

In the exemplary embodiment according to FIG. 2b, a coaxial transmission $R_3$ is shown which corresponds essentially to the set-up of the coaxial transmission $R_1$. Just as in the coaxial transmission $R_2$, a prestage 23 is inserted as a planetary prestage into this coaxial transmission $R_3$. An electric drive 32 is directly adjacent coaxially to the sun wheel 27, at least partially inside the driving element 7, in order to drive the first prestage 23, in particular the planetary prestage.

In this case, corresponding exciting coils 33 are arranged in a motor casing 34 which is connected axially to the casing part 10. The mounting 30 of the motor shaft 35, which also receives the corresponding permanent magnets, magnet winding or the like, not characterized in any more detail here, is likewise supported in the motor housing 34.

It is important in the present invention that, because of the very large inside diameter D of the driven element 3, not only the first prestage 23, but also, at least partially, the electric drive 32, can be integrated coaxially into the coaxial transmission $R_3$ also inside the latter and coaxially.

Figure 3:
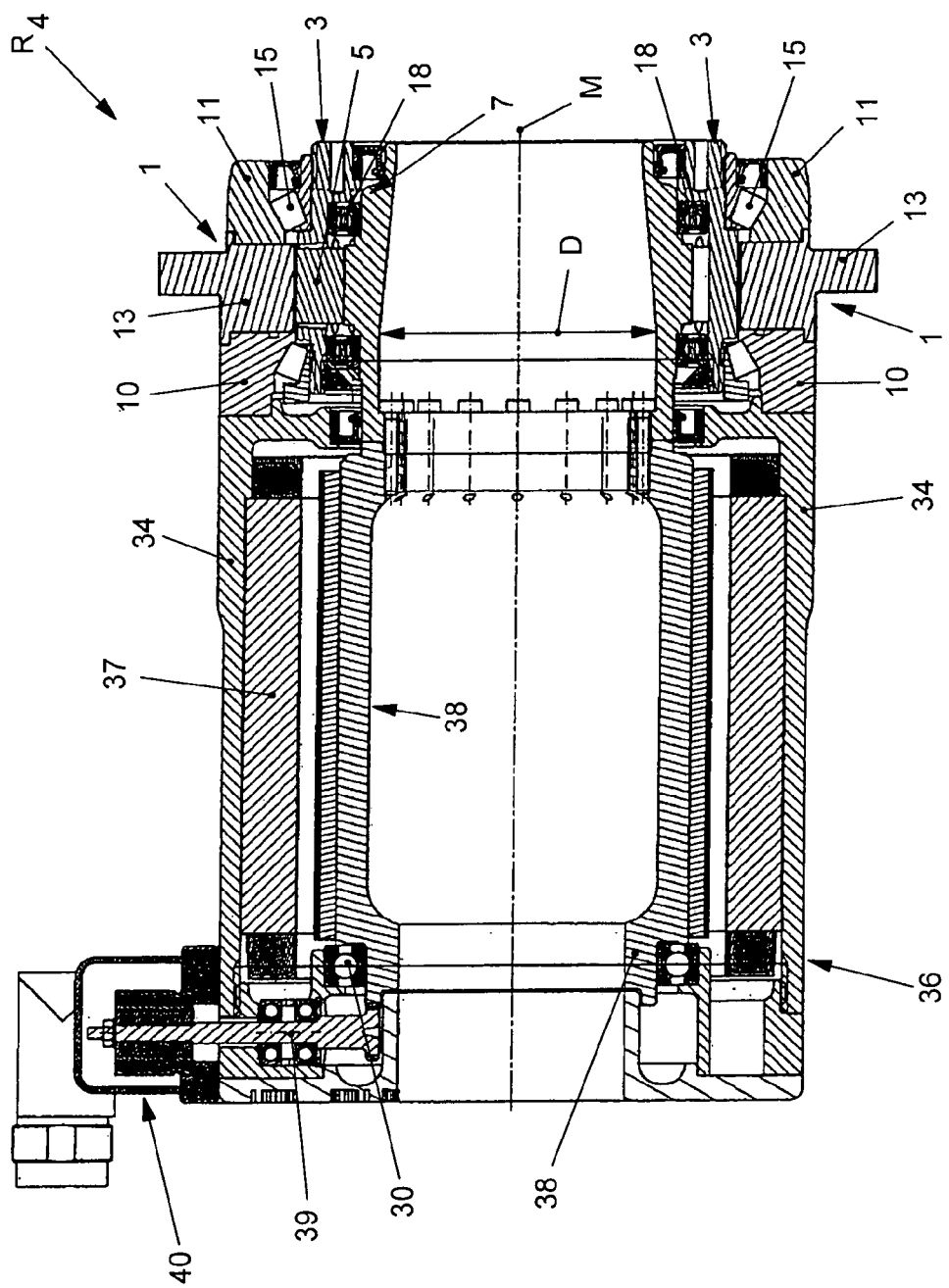
FIG. 3 shows a longitudinal section through a further exemplary embodiment of a coaxial transmission designed as a coaxial transmission with an adjacent hollow-shaft electric drive.

In the exemplary embodiment according to FIG. 3, a further coaxial transmission $R_4$ is shown which corresponds essentially to the coaxial transmission $R_1$. It has in this case proved especially advantageous that a hollow-shaft electric drive 36 can be connected to the driving element 7 on the end face in the axial direction. The hollow-shaft electric drive 36 has a motor casing 34 which can be directly connected on the end face and in the axial direction to the casing part 10 of the coaxial transmission $R_4$.

A coil winding 37 is provided as an exciting coil 33 inside the motor casing 34, in order to drive a hollow-shaft rotor 38 with permanent magnets or the like. The hollow-shaft rotor 38 is directly connected to the driving element 7 of the coaxial transmission $R_4$. The hollow-shaft rotor 38 possesses essentially the same inside diameter D as the driving element 7.

The hollow-shaft rotor 38 is supported on the end face with respect to the motor casing 34 via a bearing 30. Moreover, a measuring shaft 39, which transfers a rotational movement to a sensor element 40, and/or a break may be connected to the hollow-shaft rotor 38.

It is especially advantageous, here, that, by as large an inside diameter D as possible being ensured, hollow-shaft electric drives 36 can also be used which have the same or a similar cross section and ensure a very high drive power of the overall drive unit.

Figure 4:
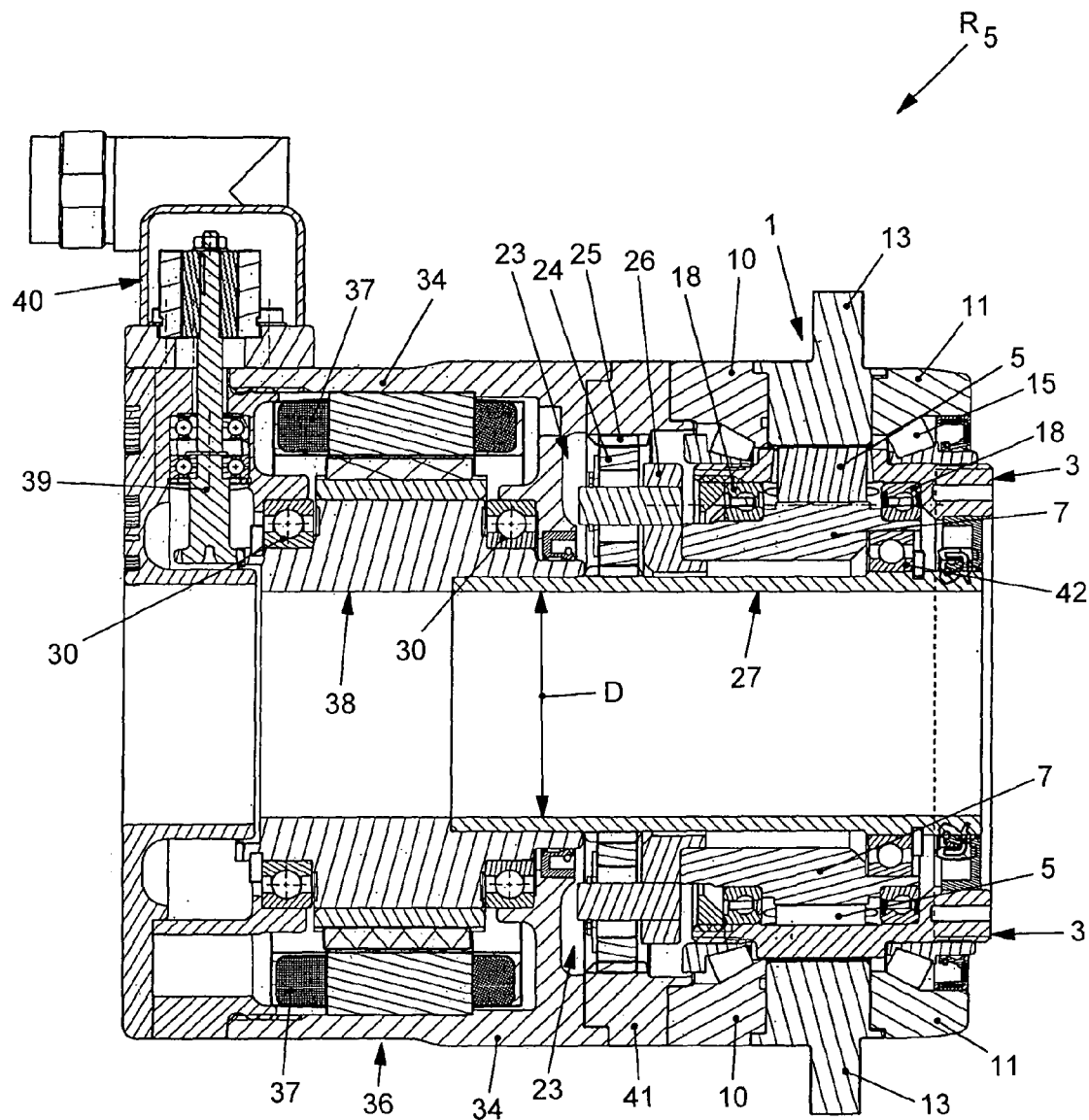
FIG. 4 shows a longitudinal section through a further exemplary embodiment of a coaxial transmission with a connected hollow-shaft electric drive and prestage.

In the exemplary embodiment of the present invention according to FIG. 4, a coaxial transmission $R_5$ is shown which corresponds approximately to the coaxial transmission $R_4$ according to FIG. 3. The difference, here, is that a prestage 23, in particular a planetary prestage, is arranged axially in an annular manner between the hollow-shaft electric drive 36 and coaxial transmission.

In this case, a sun wheel 27 designed in the manner of a hollow shaft meshes with a plurality of planets 24 which are in engagement with an internal toothing 25 of a further casing part 41, the plurality of planets 24 being guided via a common planet wheel carrier 26 arranged in an annular manner. The planet wheel carrier 26 is connected to the driving element 7. The sun wheel 27 designed as a hollow shaft is supported with respect to the driving element 7 via additional bearings 42.

In addition, the hollow-shaft rotor 38 is supported with respect to the rotor casing 34 via two end-face bearings 30, thus at the same time ensuring that the sun wheel 27 resembling a hollow shaft is mounted on the end faces.

In the present invention, it has proved especially advantageous that a first prestage 23, in particular a planetary stage, is axially inserted in an annular manner circumferentially between the hollow-shaft electric drive 36 and the casing part 10 of the original coaxial transmission $R_5$ in order to ensure a large inside diameter D. This ensures that a coaxial transmission $R_5$ which is equipped with a prestage 23 is provided in the smallest possible construction space, along with the smallest possible outside diameter, so as to ensure a maximum achievable inside diameter D.

The invention claimed is:

1. A coaxial transmission comprising a driving element and a driven element, a plurality of radially movable toothed quadrants providing a step-up and transfer of a drive torque between the driving element and driven element, wherein the driving element is a hollow shaft into which a prestage is inserted.

2. The coaxial transmission as claimed in claim 1, wherein the prestage is inserted as a planetary prestage into the driving element.

3. The coaxial transmission as claimed in claim 1, wherein the prestage is a planetary prestage comprising individual planets meshing with an internal toothing of the driving element.

4. The coaxial transmission as claimed in claim 3, wherein the individual planets are mounted in a planet wheel carrier which is arranged in the driven element.

5. The coaxial transmission as claimed in claim 4, wherein the planets mesh with a common sun wheel which can be driven via a drive shaft mounted in a bearing casing.

6. The coaxial transmission as claimed in claim 5, wherein the bearing casing for receiving the drive shaft is connected axially to a first casing part.

7. The coaxial transmission as claimed in claim 5, wherein the planetary prestage with sun wheel, planets, planet wheel carrier and drive shaft for the sun wheel is inserted coaxially inside the driving element.

8. The coaxial transmission as claimed in claim 1, wherein the driving element is inserted coaxially inside the driven element and has at least one external profiling which, during rotational movement, moves the toothed quadrants toward a ring-wheel internal toothing, there being provided axially in each case next to the profiling a drive bearing which is supported on the inside with respect to the driven element.

9. The coaxial transmission as claimed in claim 8, wherein the driven element is supported via end-face driven bearings and is mounted with respect to casing parts via bearing receptacles.

10. The coaxial transmission as claimed in claim 9, wherein a bearing seat is formed in each case on both sides next to the profiling for axial mounting of the driving element with respect to the driven element.

* * * * *